United States Patent
Niddapu

(10) Patent No.: US 9,684,733 B2
(45) Date of Patent: Jun. 20, 2017

(54) ABSTRACT INTERNATIONALIZATION OF WEB APPLICATIONS

(75) Inventor: Veerendra Kumar Niddapu, Andhra Pradesh (IN)

(73) Assignee: CA, Inc., New York, NY (US)

(*) Notice: Subject to any disclaimer, the term of this patent is extended or adjusted under 35 U.S.C. 154(b) by 1109 days.

(21) Appl. No.: 12/816,478

(22) Filed: Jun. 16, 2010

(65) Prior Publication Data
US 2011/0314081 A1  Dec. 22, 2011

(51) Int. Cl.
*G06F 15/16* (2006.01)
*G06F 17/30* (2006.01)

(52) U.S. Cl.
CPC .............. *G06F 17/30905* (2013.01)

(58) Field of Classification Search
USPC .......................................... 709/203
See application file for complete search history.

(56) References Cited

U.S. PATENT DOCUMENTS

| | | | |
|---|---|---|---|
| 6,623,529 B1* | 9/2003 | Lakritz | 715/205 |
| 7,086,009 B2* | 8/2006 | Resnick et al. | 715/771 |
| 7,194,506 B1* | 3/2007 | White et al. | 709/203 |
| 7,620,907 B2* | 11/2009 | Resnick et al. | 715/771 |
| 7,707,550 B2* | 4/2010 | Resnick et al. | 717/121 |
| 7,802,238 B2* | 9/2010 | Clinton | 717/136 |
| 7,917,888 B2* | 3/2011 | Chong et al. | 717/102 |
| 2002/0184610 A1* | 12/2002 | Chong et al. | 717/109 |
| 2003/0009250 A1* | 1/2003 | Resnick et al. | 700/94 |
| 2003/0140316 A1* | 7/2003 | Lakritz | 715/536 |
| 2003/0236576 A1* | 12/2003 | Resnick et al. | 700/9 |
| 2003/0236577 A1* | 12/2003 | Clinton | 700/10 |
| 2004/0046789 A1* | 3/2004 | Inanoria | 345/748 |
| 2006/0036941 A1* | 2/2006 | Neil | 715/526 |
| 2006/0047665 A1* | 3/2006 | Neil | 707/10 |
| 2007/0006149 A1* | 1/2007 | Resnick et al. | 717/116 |
| 2007/0033520 A1* | 2/2007 | Kimzey | G06F 9/4448 715/205 |
| 2008/0120129 A1* | 5/2008 | Seubert et al. | 705/1 |
| 2009/0300578 A1* | 12/2009 | Neil | 717/104 |
| 2010/0138778 A1* | 6/2010 | Dewan et al. | 715/789 |
| 2010/0211928 A1* | 8/2010 | Resnick et al. | 717/108 |
| 2011/0099533 A1* | 4/2011 | Clinton | 717/108 |

OTHER PUBLICATIONS

Google Web Toolkit, "Developer's Guide—Internationalization," 5 pages.

* cited by examiner

*Primary Examiner* — Hua Fan
(74) *Attorney, Agent, or Firm* — Baker Botts L.L.P.

(57) ABSTRACT

According to one embodiment of the present invention, a method for abstract internationalization of web applications may be provided. In this method, a first set of object files may be generated according to a locale of a plurality of locales and one or more properties files. Each properties file may be associated with a web application of a plurality of web applications. A localization module operable to facilitate abstract internationalization of a web application may be stored. A request to use the web application may be received from a client. The request may indicate a locale of the client. A second set of one or more object files may be selected according to the web application and the locale of the client. A response comprising markup language that describes the web application, the second set of object files, and the localization module may be generated and transmitted to a client.

16 Claims, 2 Drawing Sheets

ABSTRACT INTERNATIONALIZATION OF WEB APPLICATIONS

TECHNICAL FIELD

This invention relates generally to the field of web applications and more specifically to abstract internationalization of web applications.

BACKGROUND

Web applications may be requested by users in various geographic regions. These users may speak various languages. A web application may be internationalized to facilitate use of the web application by diverse users. "Internationalization" may refer to implementing a web application to support multiple locales. "Localization" may refer to the process of customizing a web application according to a locale of a client so that the client can use the application.

SUMMARY OF THE DISCLOSURE

In accordance with the present invention, disadvantages and problems associated with previous techniques for internationalizing web applications may be reduced or eliminated.

According to one embodiment of the present invention, a method for abstract internationalization of web applications may be provided. In this method, a first set of object files may be generated according to a locale of a plurality of locales and one or more properties files. Each properties file may be associated with a web application of a plurality of web applications. A localization module operable to facilitate abstract internationalization of a web application may be stored. A request to use the web application may be received from a client. The request may indicate a locale of the client. A second set of one or more object files may be selected according to the web application and the locale of the client. A response comprising markup language that describes the web application, the second set of object files, and the localization module may be generated and transmitted to a client.

Certain embodiments of the invention may provide one or more technical advantages. A technical advantage of one embodiment may be that a web application does not need to be recompiled to support locales added after deployment of the web application. Another technical advantage of one embodiment may be that a web application may support GWT static and dynamic localization.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
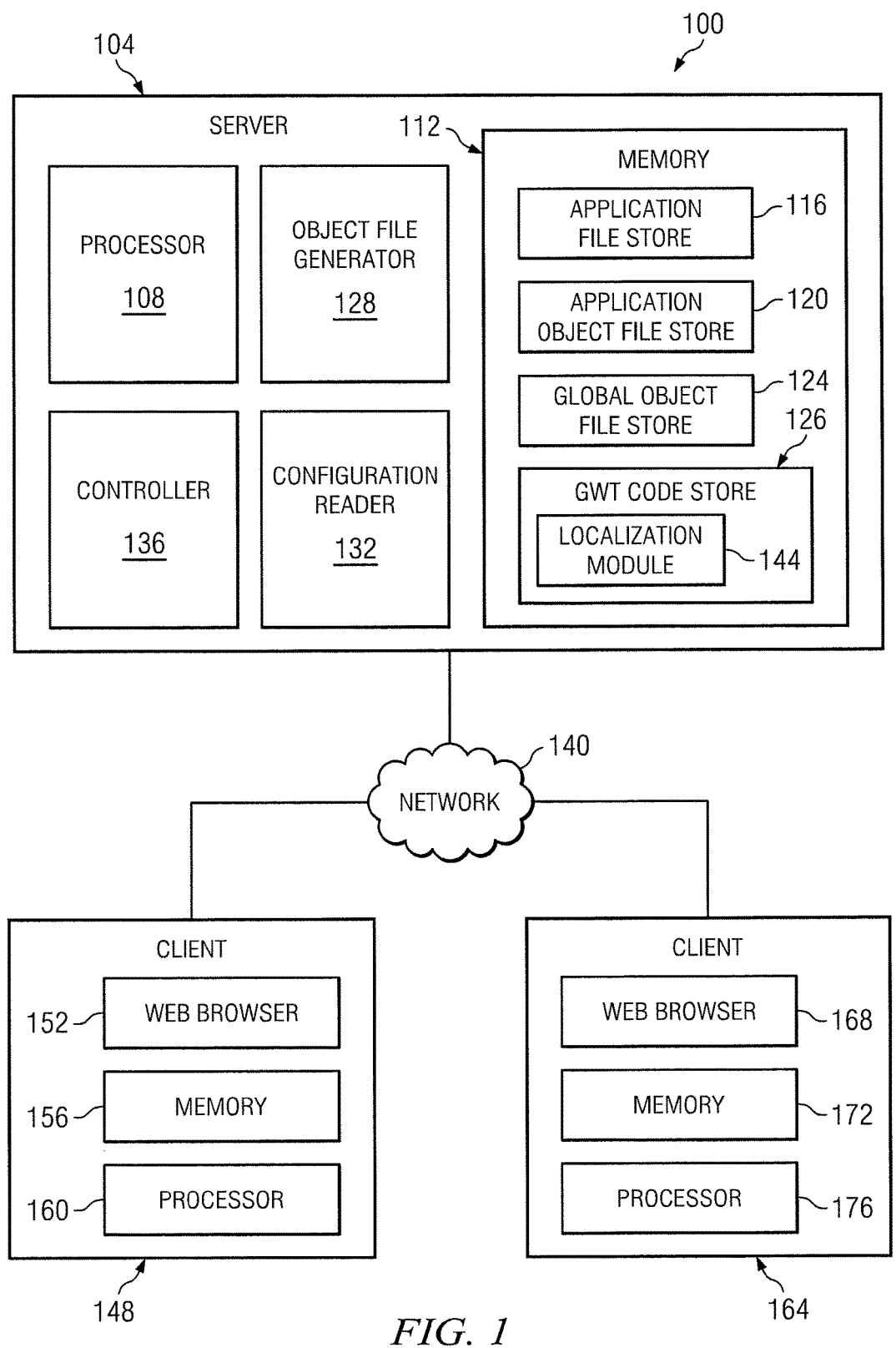
FIG. 1 depicts an embodiment of a system that supports abstract internationalization of a web application.
Figure 2:
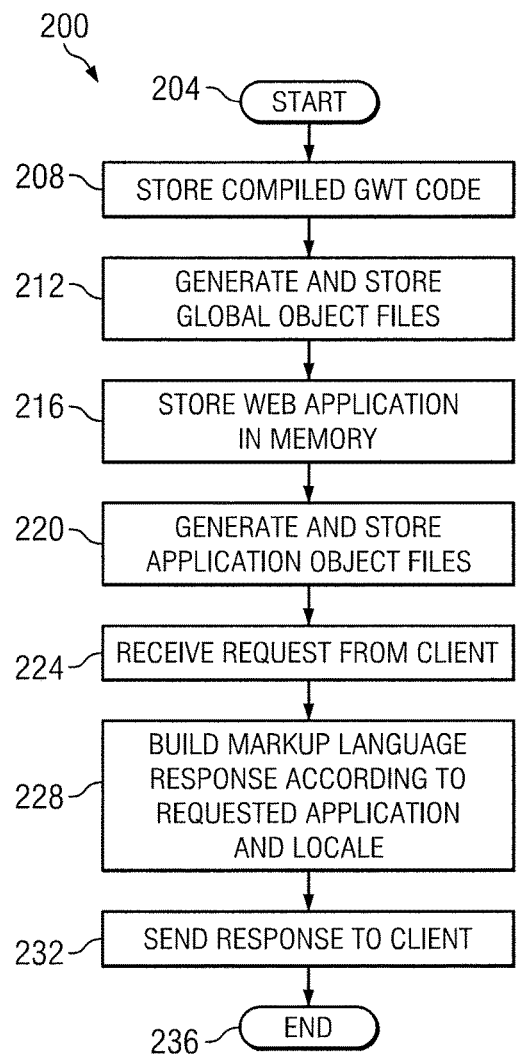
FIG. 2 depicts an example of a method for supporting abstract internationalization of a web application that may be performed by a server.
Figure 3:
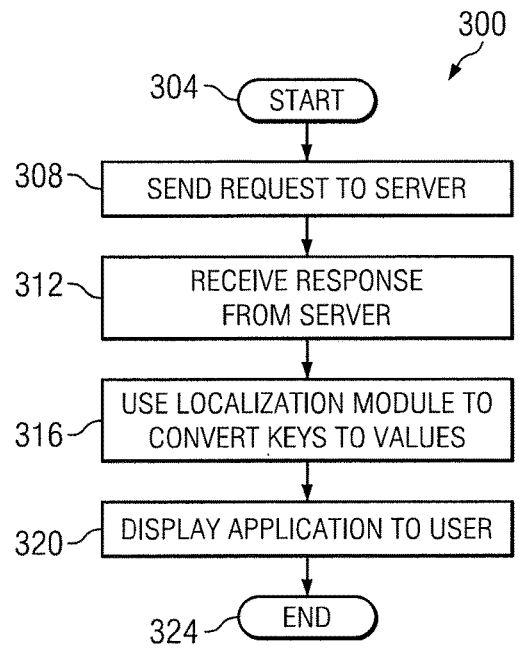
FIG. 3 depicts an example of a method for supporting abstract internationalization of a web application that may be performed by a client.

Embodiments of the present invention and its advantages are best understood by referring to FIGS. 1-3 of the drawings, like numerals being used for like and corresponding parts of the various drawings.

FIG. 1 depicts an embodiment of a system 100 that supports abstract internationalization of a web application. In the illustrated example, system 100 includes a server 104 and clients 148 and 164 coupled as shown. Server 104 includes one or more processors 108, a memory 112, a controller 136, an object file generator 128, and a configuration reader 132. Memory 112 includes an application file store 116, an application object file store 120, a global object file store 124, and a GWT code store 126. GWT code store 126 includes a localization module 144. In the illustrated embodiment, client 148 includes one or more processors 160, a memory 156, and a web browser 152. Client 164 includes similar components.

In certain embodiments of system 100, server 104 may generate a first set of one or more object files according to a locale of a plurality of locales and according to one or more properties files. Each properties file may be associated with a web application of a plurality of web applications. A localization module 144 operable to facilitate abstract internationalization of a web application may be stored. A request to use a web application may be received from a client 148. The request may indicate a locale of the client 148. A second set of one or more object files may be selected according to the web application and the locale of the client 148. A response comprising markup language that describes the web application, the second set of object files, and the localization module 144 may be generated by the server 104 and transmitted to a client 148.

In some embodiments, server 104 may be a web server or other device with a storage component that is accessible by multiple computers of a network. Server 104 has an application file store 116 that stores files used to execute a web application. A web application may be an application, such as a software program, that may be executed by a variety of users of a network, such as the Internet. In some embodiments, the web application may be a GWT based web application, that is, it may be developed using a version of the Google Web Toolkit ("GWT"). In some embodiments, the files used to execute the web application may include compiled code of the web application, such as markup language files, JavaScript files, and/or other suitable files.

The source code and/or compiled source code of the web application may comprise keys, which serve as placeholders for values of a locale. A locale is a preference that specifies rules for presenting (such as displaying) information. In some cases, a client may be associated with a particular locale. Examples of locales include a language, geographic region, or other preference. Examples of presentation rules include language and formatting rules. For example, a "US locale" may specify presentation rules for formatting dates, such as MM/DD/YYYY, where "MM" represents month, "DD" represents day, and "YYYY" represents year.

A web application may have one or more properties files that each correspond to a locale supported by the web application. A properties file may be a properties file (such as a properties resource bundle) in a Java-related programming language or any other suitable file for storing configurable parameters of a web application. Each properties file may have one or more key/value pairs for a locale. A key/value pair may comprise a key matched with a value of the key for the locale. A key may be a variable, for example, "date format," that can take on values, for example MM/DD/YYYY or DD/MM/YYYY. In some embodiments, the values may be constants, messages, number formats, date formats, time formats, or other suitable parameters.

In some embodiments, a constant may be a fixed value that may be substituted for a key. For example, a constant may be a string, label, and/or other suitable parameter. As an example, a web application may display a string that represents a greeting. The web application may have a properties file for each language that it supports. Each properties file may include the key "greeting." If the web application supports the English, Japanese, Spanish, and French languages, the associated properties files may have values "hello," "konnichiwa," "hola," and "bonjour," respectively. When the web application is localized, the key is replaced with the value providing the appropriate greeting of the locale of the client that accesses the web application.

In some embodiments, a message may comprise one or more strings and/or one or more parameters that may have locale-specific values. An example of a message is: "My name is {0} {1}," where "{0}" and "{1}" may be parameters that correspond to a first name and a last name. For example, parameter {0} may have the value "John" and parameter {1} may have the value "Smith." The message may also have a locale-specific ordering. For example, if the message is displayed in Japanese, the order of the first and last name may be reversed. As another example, the placement of the parameters with respect to the string portion of the message ("My name is") may be changed.

In some embodiments, other formats, such as number, date, time, month, weekday, era (such as B.C. or B.C.E.), and/or other suitable formats may be specified in properties files. For example, a web application may display the current date and may have a series of properties files that include the key "date format." The corresponding values in the properties files for US and French locales may be "MM/DD/YYYY" and "DD/MM/YYYY," respectively.

In some embodiments, object file generator 128 converts properties files into object files and stores the files in application object file store 120 and global object file store 124 of memory 112. Object files may be generated from properties files or may be created independently. An object file may be JavaScript Object Notation (JSON) file or other appropriate parseable file that may comprise localization information (such as a collection of key/value pairs) of a web application.

Application object file store 120 may store application object files. In some embodiments, application object files may be object files that are specific to a particular web application. For example, application object files may include key/value pairs for strings, messages, labels, or other suitable parameters of a particular web application. In some embodiments, object file generator 128 may generate application object files when an application is invoked.

Global object file store 124 may store global object files. In some embodiments, each global object file comprises localization information, such as key/value pairs, that may be used by more than one web application. For example, global object files may include number formats, date formats, time formats, and/or other formatting information. In some embodiments, global object files may be generated once and stored for use by various applications. In some embodiments, global object files may be generated during development of a web application.

GWT code store 126 may comprise compiled GWT code that facilitates execution and/or localization of a web application. GWT code store 126 may comprise localization module 144. In certain embodiments, localization module 144 may comprise logic that facilitates internationalization and localization of a web application. After a web application is localized, it may be presented in a manner that is familiar to a user of client 148.

Controller 136 may receive a request from client 148 for a web application. The request may indicate a locale of the client 148. Controller 136 may send a request to configuration reader 132 to retrieve the object files that correspond to the requested locale from memory 112. Controller 136 subsequently generates a markup language response that describes the web application, the object files, and the localization module 144. For example, the markup language response may comprise the object files and compiled code of the web application and localization module.

Client 148 is operable to send a request for a web application, receive a response describing the web application, and present the web application to a user of client 148. Client 148 may include a web browser 152 that requests a web application and renders markup language to present the web application to a user of client 148. Client 148 may also use the localization module 144 to facilitate localization of a web application. For example, in some embodiments, code that describes the localization module 144 may be included in a response from the server 104 and executed by web browser 152. When executed, the code of the localization module may convert keys of the response to localized values included in the object files of the response. Client 148 may also include one or more processors 160 and memory 156 for facilitating the operations of the web browser 152.

A web application, such as a GWT based web application, may be internationalized in any suitable manner. In some embodiments, a static internationalization approach may include compiling the source code of the web application to generate at least one static markup language file for each supported locale. Markup language files may comprise Hypertext Markup Language (HTML) code, Extensible Markup Language (XML) code, or other appropriate markup language code. In the static approach, the keys of the source code of a web application are replaced with values associated with a locale and the resulting code is compiled into a markup language file. In some embodiments, a markup language file may be produced for each supported locale of the web application. In the static approach, if support for an additional locale is desired after a web application has been deployed, the web application source code may need to be recompiled to generate the markup language files to support the additional locale.

In some embodiments, localization module 144 may utilize a dynamic internationalization approach. In this approach, a single markup language file may be generated from the web application source code at compile time (in contrast with a separate markup language file for each supported locale). In some embodiments, a markup language file may be generated for each browser type that the web application supports. The resulting markup language may be localized at runtime with the help of the localization module 144 according to the desired locale. The dynamic internationalization approach may provide support of original and add-on locales without requiring recompilation of the web application source code, which may reduce memory and compiling requirements.

Some embodiments may support abstract internationalization. Under abstract internationalization, either a static approach or a dynamic approach may be used. In some embodiments, abstract internationalization may support static internationalization and dynamic internationalization regardless of the structure of the source code of a web application. Thus, a developer may code an application without regard for the internationalization approach that will be used. In some embodiments, the localization module 144 may support abstract internationalization. For example, in some embodiments, the localization module 144 may support dynamic internationalization for existing web applications that were developed and/or deployed for use with the static approach. In some embodiments, server 104 may have the ability to choose whether the static approach or the runtime approach is implemented. In some embodiments, if one internationalization approach fails, the server 104 may automatically switch to the other internationalization approach.

In some embodiments, the web application may also accommodate various web browser types, such as Internet Explorer, Firefox, Chrome, Safari, Opera, mobile browsers, and/or other browsers. In some embodiments, if support for five web browsers and n locales is desired, under the static approach, 5*n static markup language files may be generated. In some embodiments, the dynamic approach may support the same browsers and n locales with only five markup language files (one for each browser), thus reducing the memory requirements of the web application.

As discussed earlier, a web application may be developed using a version of GWT. A drawback of the GWT is that it does not natively include the ability to dynamically internationalize parameters other than strings. Accordingly, in some embodiments, the localization module 144 may comprise a software library that includes one or more software modules that enable dynamic internationalization for constants, messages (including message formats), and/or other formats of a web application at runtime. In some embodiments, localization module 144 may be a library of programming code of a version of the Java programming language, JavaScript, Or other suitable language. For example, localization module 144 may be a GWT library of programming code.

In some embodiments, the localization module 144 may localize constants at runtime. In some embodiments, the localization module 144 may comprise a wrapper class that utilizes the "Dictionary" utility of the GWT. The Dictionary utility allows a key representing a constant to be replaced with a string value at runtime, but does not provide formatting capabilities and can only return values that are strings. In some embodiments, the localization module 144 may comprise application programming interfaces ("APIs") for obtaining the localized value of a key as a string, string array, Boolean, double, floating number, integer, map, and/or other suitable type at runtime. In some embodiments, the localization module 144 may implement the GWT "Constants" and/or "Constants With Lookup" interfaces with code that allows such localization at runtime. In some embodiments the implementation of these interfaces may enable abstract internationalization of constant formats.

In some embodiments, the localization module 144 may localize messages at runtime. In some embodiments, the localization module 144 may comprise a wrapper class that utilizes the Dictionary utility of GWT to produce a value for the string portion of the message. Because the GWT Dictionary utility cannot format a message at runtime, the localization module 144 may include logic for doing so. For example, in some embodiments, the localization module 144 may convert an object file that specifies a value for a message into markup language that comprises a message with the appropriate parameter values and ordering. In some embodiments, the localization module 144 may implement the GWT "Message" interface with appropriate logic to enable such functionality. In some embodiments, this implementation may enable abstract internationalization of label and message formats.

In some embodiments, the localization module 144 may localize other formats, such as number, date, time, month, weekday, era (such as B.C. or B.C.E.), and/or other suitable formats of a web application at runtime. In some embodiments, localization module 144 may implement the "NumberConstants" and/or "DateTimeConstants" interfaces of GWT to enable dynamic internationalization of date, time, and/or number formatting text. In some embodiments, the localization module 144 may implement a GWT internationalization related interface, such as "CurrencyCodeMapConstants", that enables dynamic internationalization of other formatting text. These interfaces are normally used in GWT for static internationalization. In some embodiments, in order to enable abstract internationalization of date, number, and/or time formats, the localization module 144 may override the "NumberFormat" and/or "DateTimeFormat" classes of GWT that normally invoke the NumberConstants and DateTimeConstant interfaces. In some embodiments, the localization module 144 may override other GWT internationalization utility classes, such as "Timezone", to enable abstract internationalization of other formats.

FIG. 2 depicts an example flow 200 of a method for supporting internationalization of a web application that may be performed by a server 104. The flow begins at step 204. At step 208, the server stores compiled GWT code. For example, the server may store compiled code of the localization module 144. At step 212, object file generator 128 generates global object files and the files are stored in global object file store 124. In some embodiments, the global object files may be generated and stored during development of a web application. Accordingly, the global object files may be available when the web application (or a different web application that uses the same global object files) is invoked and may not need to be generated again. At step 216, the web application is stored in application file store 116. At step 220, object file generator 128 generates application object files and the files are stored in application object file store 120. In some embodiments, the application object files may be generated when the application is invoked.

At step 224, server 104 receives a request from a client 148 to use the web application. The request may indicate a locale of the client 148. In some embodiments, the local may be a browser locale, an operating system locale, a user-specified locale, or other suitable locale. In some embodiments, the client may indicate the locale as part of a query string in a Uniform Resource Locator (URL) address or by other suitable method.

At step 228, the server builds a markup language response according to the requested web application and locale. The request from the client may be sent to controller 136, which then sends a request for the appropriate files to configuration reader 132. The configuration reader 132 may select files according to the locale of client 148 and the requested web application. For example, configuration reader 132 may select application object files that correspond to the requested web application and locale of the client 148, global object files that correspond to the locale of the client 148, and/or one or more markup language files that describe the web application and the localization module 144. In some embodiments, the one or more markup language files may comprise markup language (such as HTML code) that is rendered by a client's web browser during use of the web application by client 148. The controller 136 may then create a response that includes the markup language files and object files. For example, the controller 136 may embed the object files within the markup language that describes the web application and localization module 144. At step 232, this response is sent to client 148. The flow ends at step 232.

The steps of flow 200 may be repeated and/or may be performed in various orders. For example, the steps may be repeated for a client 164 that sends a request for a different application and/or a request that indicates a different locale.

FIG. 3 depicts an example flow 300 of a method for supporting internationalization of a web application that may be performed by a client 148. The flow begins at step 304. At step 308, a request for a web application is sent to server 104. The request may include a locale of the client 148. At step 312, a response that comprises one or more object files and markup language is received from the server 104. At step 316, the client uses the localization module 144 to convert keys of the markup language to values specified in the object files included in the response. In some embodiments, the localization module 144 may utilize one or more software modules that are able to localize parameters such as constants, message formats, number formats, date formats, time formats, and/or other parameters. For example, these modules may read key/value pairs of the object files and produce markup language with values associated with the locale of the client 148. This markup language may be integrated with the markup language that describes the web application.

At step 320, the client 148 displays the application to the user. In some embodiments, the web browser 152 may render the localized markup language to present the web application according to the locale of the client 148. The flow ends at step 324. The steps of flow 300 may be repeated and/or may be performed in various orders.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The method may include more, fewer, or other steps.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method, comprising:
   storing, by a server, a first set of one or more object files, each object file generated according to a locale of a plurality of locales, each object file generated according to one or more properties files, each properties file associated with a web application of a plurality of web applications;
   storing, by a server, a localization module configured to facilitate dynamic internationalization of a web application configured for static internationalization;
   receiving, by a server and from a client, a request to use the web application, the request indicating a locale of the client;
   determining, by the server, that static internationalization for the request has failed, wherein the web application was developed for static internationalization;
   in response to determining that static internationalization has failed, identifying, by the server, one or more constants in a first one of the one or more object files, wherein the one or more object files are executed at the client to generate markup language describing the web application;
   generating, using the localization module, a new object file according to the locale of the client, wherein the new object file comprises a localized string for each constant in the first object file, each localized string being generated based on the locale of the client;
   generating, by the server, a response comprising the new object file, the first object file, and the localization module;
   transmitting, by the server, the response to the client;
   by the localization module and at the client, inserting each localized string from the new object file in place of each constant in the generated markup language; and replacing a plurality of locale-independent keys of the first object file with a plurality of values that correspond to the locale of the client from the new object file.

2. The method of claim 1, further comprising:
generating a third set of one or more object files, each object file in the third set being generated according to a locale of the plurality of locales, each object file comprising common localization information of a plurality of web applications.

3. The method of claim 1, further comprising:
generating at least one additional object file according to at least one properties file to allow localization of the web application according to an additional locale.

4. The method of claim 1, the web application developed using a GOOGLE WEB TOOLKIT (GWT).

5. The method of claim 1, the localization module further comprising:
a class that overrides a GWT class to enable abstract internationalization of a format of one or more of a date, a time, a number, a constant, a label, and a message; and
an implementation of a GWT interface to enable dynamic internationalization of a format of one or more of a date, a time, a number, a constant, a label, and a message.

6. An apparatus comprising:
a memory operable to:
store a first set of one or more object files, each object file generated, by a server, according to a locale of a plurality of locales, each object file generated according to one or more properties files, each properties file associated with a web application of a plurality of web applications;
store a localization module configured to facilitate dynamic internationalization of a web application configured for static internationalization;
one or more processors associated with a server operable to:
receive, from a client, a request to use the web application, the request indicating a locale of the client;
determine that static internationalization for the request has failed;
in response to determining that static internationalization has failed, identifying one or more constants in a first one of the one or more object files, wherein the one or more object files are executed at the client to generate markup language describing the web application;
generate, using the localization module, a new object file according to the locale of the client, wherein the new object file comprises a localized string for each constant in the first object file, each localized string being generated based on the locale of the client;
generate a response comprising the new object file, the first object file, and the localization module; and
transmit the response to the client, wherein
the localization module, at the client, inserts each localized string from the new object file in place of each constant in the generated markup language; and
replace, at the client, a plurality of locale-independent keys of the first object file with a plurality of values that correspond to the locale of the client from the new object file.

7. The apparatus of claim 6, the one or more processors further operable to:
generate a third set of one or more object files, each object file in the third set being generated according to a locale of the plurality of locales, each object file comprising common localization information of a plurality of web applications.

8. The apparatus of claim 6, the one or more processors further operable to: generate at least one additional object file according to at least one properties file to allow localization of the web application according to an additional locale.

9. The apparatus of claim 6, the web application developed using a GOOGLE WEB TOOLKIT (GWT).

10. The system apparatus of claim 6, the localization module further comprising: a class that overrides a GWT class to enable abstract internationalization of a format of one or more of a date, a time, a number, a constant, a label, and a message; and
an implementation of a GWT interface to enable dynamic internationalization of a format of one or more of a date, a time, a number, a constant, a label, and a message.

11. A non-transitory computer-readable storage medium having computer-executable code, when executed by one or more processors operable to:
store, by a server, a first set of one or more object files, each object file generated according to a locale of a plurality of locales, each object file generated according to one or more properties files, each properties file associated with a web application of a plurality of web applications;
store, by the server, a localization module configured to facilitate dynamic internationalization of a web application configured for static internationalization;
receive, by the server and from a client, a request to use a web application, the request indicating a locale of the client;
determining, by the server, that static internationalization for the request has failed by determining that none of the object files have been generated according to the locale of the client;
in response to determining that static internationalization has failed, identifying, by the server, one or more constants in a first one of the one or more object files, wherein the one or more object files are executed at the client to generate markup language describing the web application;
generating, using the localization module, a new object file according to the locale of the client, wherein the new object file comprises a localized string for each constant in the first object file, each localized string being generated based on the locale of the client;
generate, by the server, a response comprising the new object file, the first object file, and the localization module; and
transmit the response to the client, wherein
the localization module, at the client, inserts each localized string from the new object file in place of each constant in the generated markup language; and
replace a plurality of locale-independent keys of the first object file with a plurality of values that correspond to the locale of the client from the new object file.

12. The medium of claim 11, wherein the localization module:
replaces a plurality of locale-independent keys of the first object file with a plurality of values that correspond to the locale of the client from the new object file.

13. The medium of claim 11, the medium further operable to:
  generate a third set of one or more object files, each object file in the third set being generated according to a locale of the plurality of locales, each object file comprising common localization information of a plurality of web applications.

14. The medium of claim 11, the medium further operable to:
  generate at least one additional object file according to at least one properties file to allow localization of the web application according to an additional locale.

15. The medium of claim 11, the web application developed using a GOOGLE WEB TOOLKIT (GWT).

16. The medium of claim 11, the localization module further comprising:
  a class that overrides a GWT class to enable abstract internationalization of a format of one or more of a date, a time, a number, a constant, a label, and a message; and
  an implementation of a GWT interface to enable dynamic internationalization of a format of one or more of a date, a time, a number, a constant, a label, and a message.

* * * * *